United States Patent [19]

Manzara

[11] Patent Number: 5,681,904
[45] Date of Patent: Oct. 28, 1997

[54] AZIDO POLYMERS HAVING IMPROVED BURN RATE

[75] Inventor: Anthony P. Manzara, Lake Elmo, Minn.

[73] Assignee: Minnesota Mining and Manufacturing Company, St. Paul, Minn.

[21] Appl. No.: 625,880

[22] Filed: Apr. 1, 1996

[51] Int. Cl.$^6$ .......................... C08G 65/32; C08F 283/06
[52] U.S. Cl. .......................... 525/404; 525/403; 525/410; 525/411; 525/412; 548/255; 149/19.6
[58] Field of Search .................. 149/19.6, 88; 525/403, 525/404, 411, 412, 410; 548/255

[56] References Cited

U.S. PATENT DOCUMENTS

| | | | |
|---|---|---|---|
| 3,645,917 | 2/1972 | Vandenberg | 260/2 |
| 4,268,450 | 5/1981 | Frankel et al. | 260/349 |
| 4,393,199 | 7/1983 | Manser | 528/408 |
| 4,414,384 | 11/1983 | Berkowitz et al. | 528/417 |
| 4,483,978 | 11/1984 | Manser | 528/408 |
| 4,781,861 | 11/1988 | Wilson et al. | 260/349 |
| 4,879,419 | 11/1989 | Johannessen | 568/606 |
| 4,891,438 | 1/1990 | Ahad | 552/11 |
| 5,124,463 | 6/1992 | Ampleman | 552/11 |
| 5,316,600 | 5/1994 | Chan et al. | 149/19.4 |
| 5,433,989 | 7/1995 | Hanai | 428/141 |

FOREIGN PATENT DOCUMENTS

| | | |
|---|---|---|
| 0 633 236 | 1/1995 | European Pat. Off. |
| 633280 | 1/1995 | European Pat. Off. |
| 0 664 310 | 7/1995 | European Pat. Off. |
| 0 673 809 | 9/1995 | European Pat. Off. |
| WO 95/01636 | 1/1995 | WIPO |

OTHER PUBLICATIONS

Bratilov "Synthesis and Testing of a Series of Diacetylene Compounds" Khim. Khim. Tekhnology 28(5) pp. 123–124; 1985.

Broeckx et al., *Cycloaddition Reactions of Azides with Electron–Poor Olefins*, Tetrahedron, vol. 2, pp. 3527–3534, (1971).

Prime et al., *Applications of DMA and TGA to Quality and Process Control in the Manufacture of Magnetic Coatings*, Journal of Coatings Technology, vol. 60, No. 761, Jun. 1988.

R. Reed, Jr., "Urethane and Triazole Cured Bamo/NMMO Propellants", 12 pages, presented by the Joint Army, Navy, NASA, Air Force, Propulsion Group, 1987.

H.L. Cohen, "The Preparation and Reactions of Polymeric Azides," Journal of Polymer Science: Polymer Chemistry Edition, vol. 19, pp. 3269–3284 (1981).

*Primary Examiner*—David Buttner
*Attorney, Agent, or Firm*—Gary L. Griswold; Walter N. Kirn; Daniel C. Schulte

[57] ABSTRACT

A polymer material formed from the reaction between ingredients comprising an azido polymer containing at least about 5 weight percent azido groups; and at least one multifunctional dipolarophile having reactive groups selected from an acrylic and an acetylenic ester or amide, the resulting polymer material comprising triazoline and/or triazole groups. Also, a method of improving the burn rate of an azido polymer including the steps of reacting an azido polymer with the above-described multifunctional dipolarophile.

41 Claims, No Drawings

AZIDO POLYMERS HAVING IMPROVED BURN RATE

FIELD OF INVENTION

The present invention relates to azido polymers and in particular, the present invention relates to crosslinked azido polymers that can be used as high-energy materials.

BACKGROUND

Azido containing compounds and polymers ("azido polymers") are important in the fields of explosives and propellants because the azido ($N_3$) group is highly energetic and can be easily incorporated into a polymer or oligomer at high weight percentage loadings. A useful class of azido polymers are oligomers, polymers or copolymers described as azido-substituted polyethers, e.g., glycidyl azide polymer ("GAP") and bis(azidomethyl)oxetane polymer ("BAMO"). Generally, the product of polymerization is a relatively low molecular weight polymer or oligomer (e.g., 500–25,000 number average Molecular Weight). Alternatively, it can be a higher molecular weight polymer (e.g., 25,000–100,000 MW). See, for example, U.S. Pat. Nos. 3,694,383; 3,645,917; 4,483,978; and 4,879,419.

In applications where the above-described azido polymers are used as high-energy materials, it is typical for the azido polymer to be mixed and processed into a liquid suspension containing various useful particles. The azido polymer can then be crosslinked to form a solid material that is convenient to store and to utilize. Chain extension reactions that react a di- or poly-isocyanate with terminal hydroxyl groups of the azide polymer are commonly used to change the azido polymer to a useful solid.

For example, hydroxyl-functional azido polymers are often cured with polyisocyanates via a urethane-forming mechanism. However, this method of crosslinking azido polymers has known shortcomings. First of all, this approach involves the use of multifunctional isocyanates, which unfortunately tend to be highly toxic and potentially skin sensitizing. The risks of handling these isocyanates can be reduced by the choice of (1) less reactive or (2) less volatile, higher molecular weight crosslinking materials. However, these limited choices of polyisocyanates may not be attractive due to the increase in cure time and temperature required. In some cases the use of these higher molecular weight isocyanate crosslinkers is undesirable due to dilution of the high energy material with an increased mass of the backbone material of the crosslinking molecule. Further, for any use of isocyanates, a high energy polymer will be diluted by the inclusion of relatively low energy urethane linkages. These further lower the energy of the system.

The use of polyisocyanates to cure azido polymers has other drawbacks. Cure of hydroxyl groups with an isocyanate crosslinking agent is susceptible to interference by the presence of moisture. Moisture present in other ingredients of an end product (e.g., fillers), or in the atmosphere surrounding the reaction, can inhibit the cure reaction. Thus, care must be taken to prevent moisture from being present in the reactants, in other ingredients of the desired product, or in the atmosphere surrounding the reaction.

As another drawback, the extent of crosslinking of an azido polymer is limited by stoichiometric factors when crosslinked with a multifunctional isocyanate. An azido polymer can only be reacted with polyisocyanates at terminal hydroxy groups, and azido polymers generally contain no more than a few terminal hydroxy groups, typically about 2 or 3. As a result, it can be difficult to obtain a solid reaction product of a useful modulus by crosslinking an azido polymer with a polyisocyanate.

Overall, the use of polyisocyanate crosslinkers to modify the properties of azido polymers has inherent limitations. This is especially true when the crosslinked polymer material is intended to be used in high energy applications.

SUMMARY OF THE INVENTION

In accordance with the present invention, it has been discovered that liquid azido polymers can be crosslinked through some or all of the azido groups, with a multifunctional dipolarophile having a reactive group selected from acrylic and acetylenic esters or amides, to produce a polymer material comprising triazoline and/or triazole groups. The resulting polymer material can be a solid having a wide range of hardness and burning properties. The polymer material can be used in a wide variety of applications, for example as high energy materials or coatings used as high energy materials such as explosive materials or rocket propellants, or as a gas-generating propellant such as a component of an air bag apparatus. As further examples, the polymer material can be used as a destructible adhesive, as a destructible coating such as a coating for gun propellant grains, or as other high energy or destructible products.

The use of multifunctional dipolarophiles to crosslink an azido polymer at the azido groups offers many advantages. First of all, the use of highly functional dipolarophiles can reduce the relative amount of crosslinking agent required to achieve a desired degree of crosslinking, thereby maintaining a higher percentage of high energy chemical moieties in the crosslinked polymer material, and increasing the high energy properties of the crosslinked polymer material. Further, the reaction between an azido polymer and a multifunctional dipolarophile is not stoichiometrically limited by the amount of hydroxy groups contained in the azido polymer. An azido polymer can have a relatively large amount of pendant azido groups, and a multifunctional dipolarophile can react with some or all of these azido groups. This allows for extensive control of the degree of crosslinking of the azido polymer, and the production of reaction products having a wide variety of morphologies and/or hardness properties. For instance, the crosslinked polymer material can be a soft, rubbery solid material, a plastic-like solid material, or a solid material having hardness properties anywhere between.

The reaction between a multifunctional dipolarophile and an azido group is insensitive to moisture compared to standard urethane cure systems. Thus, there is no need to take special precautions to prevent moisture from being present in the reactants or the reaction atmosphere. For example, there is no need to dry fillers or other reactants, or to control the humidity of the reaction atmosphere.

Also, the use of the described dipolarophiles has advantages in producing crosslinked high energy materials. Crosslinking at azido groups with these dipolarophiles changes the azido group to a triazoline or a triazole group, which can enhance the burn rate of the crosslinked polymer.

Finally, the reaction between an azido polymer and the above-described multifunctional dipolarophiles can occur at relatively low temperatures. For instance, the reaction can take place at below 90° C., and preferably takes place at temperatures of about room temperature, or lower. This can be an important safety advantage in the production of high energy materials, and can also provide cost savings and efficiency in manufacturing the crosslinked polymer material.

Thus, in one embodiment of the present invention there is provided novel polymers formed from the reaction between an azido polymer that contains at least about 5 weight percent azido groups, and at least one multifunctional dipolarophile having reactive groups selected from acrylic and acetylenic esters and amides, and mixtures thereof. The resulting polymer material comprises triazoline and/or triazole groups.

Another aspect of the present invention provides a method of modifying the burning properties of an azido polymer. The method comprises the steps of providing an azido polymer that contains at least about 20 weight percent azido groups, and crosslinking the azido polymer with a multifunctional dipolarophile. The multifunctional dipolarophile comprises reactive groups selected from an acrylic and acetylenic ester or amide, and mixtures thereof. The resulting polymer material comprises triazoline and/or triazole groups.

As used herein:

"azido" refers to —$N_3$, bonded to a carbon atom;

"azido polymer" refers to a polymer, copolymer, or oligomer having an attached azido group or an attached azido containing group;

"azido containing group" refers to an organic chain or structure that contains an azido group. An example is —$CH_2N_3$;

"triazoline and triazole" refers to triazolines, triazoles, as well as their thermal transformation structures. See R. Huisgen, G. Szeimies, and L. Mobius, 3+2 dipolar cyclo additions, 99 Chem. Ber. 475 (1966).

DETAILED DESCRIPTION

The azido polymer used as a reactant in the present invention can be any polymer, copolymer, oligomer, etc., that contains a pendant azido (—$N_3$) group, or a pendant azido containing group. Preferred azido polymers include linear or branched glycidyl azide polymers (GAP), such as GAP polymers having hydroxy-terminal ends, known as diols or polyols, as well as GAP polymers that do not include hydroxy terminated ends, known as GAP plasticizers. Examples of these azido polymers are described in U.S. Pat. Nos. 4,268,450 (Frankel), 4,891,438 (Ahad), 5,124,463 (Ampleman), 5,223,056 (Ampleman), and others. Other useful azido polymers include polyoxetane polymers that include one or more azido-group-containing repeating units. Specifically, these azido polymers can include those derived, for example, from 3,3-bisazidomethyloxetane (BAMO) and 3-azidomethyl-3-methyl oxetane (AMMO). Such azido polymers are described, for example, in U.S. Pat. Nos. 4,393,199, 4,414,384, and 4,483,978.

In one preferred embodiment, the azido polymer has the general formula:

$$X + (R)_n \rightarrow_m L \quad (I)$$

wherein:

X represents a hydroxyl, azido, mercapto, alkoxy, nitro, cyano, or amino (including mono-alkyl and aryl-substituted amino) group and preferably, X is an azido or a hydroxyl group.

R represents a divalent monomer group, containing an —$N_3$ group, derived from a cyclic ether such as, for example, —$CH_2CH(CH_2N_3)O$—, —$CH_2C(CH_3)(CH_2N_3)CH_2O$—, $CH(CH_2N_3)CH_2O$—, —$CH_2C(CH_2N_3)_2CH_2O$—, —$CH(CH_2N_3)CH(CH_2N_3)O$—, and —$CH_2CH(N_3)CH_2O$—;

L represents oxygen or a mono-, di-, tri-, tetra-, penta-, hexavalent etc., alkyl radical. Non-limiting examples of monovalent radicals are methyl and ethyl. Non-limiting examples of polyvalent alkyl radicals are ethylene, methylene, propylene, 1,2,3-propanetriyl, 2-ethyl-2-methylene-1,3-propanediyl, 2,2-dimethylene-1,3-propanediyl, etc.;

corresponding to L, m can be from 1 to 6; and n represents any positive integer equal to at least 1, n is preferably at least 3, and n is more preferably at least 5.

The azido polymer of Formula (I) can be produced by methods well known to those skilled in the art of synthetic organic chemistry. Examples of these methods are disclosed in U.S. Pat. Nos. 3,645,917 and 4,879,419.

In another preferred embodiment, the azido polymer has recurring units of the following general formula:

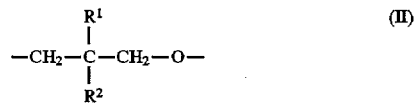

wherein: $R^1$ represents an azido containing group such as —$ZN_3$, wherein Z is preferably a divalent linking group such as a lower alkylene group; and $R^2$ represents hydrogen, a lower alkyl group such as methyl, an alkoxy-containing group such as methoxy methyl, or an azido containing group that can be the same as or different than $R^1$. The azido polymer comprising the repeating units of Formula (II) can be prepared by procedures well known to those skilled in the art of synthetic organic chemistry such as disclosed, for example, in U.S. Pat. No. 3,694,383.

In another preferred embodiment, the azido polymer is a copolymer having repeating units derived from different comonomers, one or more of which contains an azido group or an azido containing group. The comonomers can preferably be cyclic oxides having three to six ring atoms. Copolymerization of the monomers can preferably be carried out by cationic polymerization. The foregoing copolymers and their method of preparation are disclosed, for example, in U.S. Pat. No. 4,483,978.

The molecular weight of the azido polymer can preferably be in the range from about 200 to 100,000, more preferably in the range from about 500 to 25,000, and can most preferably be in the range from about 700 to 10,000. Any of these values can be adjusted, however, based on the chemical identity of the azido polymer, whether the azido polymer contains other pendant groups, whether the azido group is directly connected to the backbone or is connected through a linking group, the processing technique to be used, the desired properties of the crosslinked polymer material, etc.

Preferably, the azido polymer can contain at least about 5 weight percent, more preferably at least about 20 weight percent, and even more preferably at least about 30 or 40 weight percent azido (—$N_3$) groups, based upon the total weight of the azido polymer. The upper practical limit of weight percent of azido groups of presently produced azido polymers is about 60 percent. The azido groups may be terminal in addition to being pendant to the polymer.

In the practice of the present invention, the azido polymer is crosslinked with a multifunctional dipolarophile molecule to form a crosslinked polymer material comprising azido polymers connected through triazoline or triazole groups. The multifunctional dipolarophile comprises two or more reactive dipolarophile groups that can react with azido groups to form triazolines or triazoles. The reactive dipolarophile groups can be, for example, acrylic esters, acrylic amides, acetylenic esters, acetylenic amides, or mixtures thereof. As an example, the multifunctional dipolarophile molecule can be a multifunctional acrylic ester or acrylic amide molecule having the general formula::

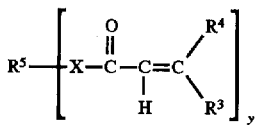
(III)

wherein y is preferably in the range from about 2 to 6, most preferably 2, 3 or 4; each X is independently a divalent linking group such as oxygen (—O—) or —NR$^6$—, where R$^6$ is a relatively low molecular weight substituent such as hydrogen or a lower alkyl group; R$^3$ and R$^4$ are independently relatively low molecular weight substituents such as hydrogen or a lower alkyl group such as a methyl group; and the precise nature of R$^5$ is not critical. For example, R$^5$ can be any useful material such as any material known to be useful as a polymeric backbone. Some useful R$^5$ groups can contain one or more alkyl moieties, aromatic moieties such as aryl segments, heterocyclic moieties, oligomeric or polymeric moieties, ether segments, urethanes, epoxies, etc., any of which can be straight, branched, cyclic, saturated, or unsaturated. R$^3$ and R$^4$ can be connected to form a cyclic group, or R$^5$ can be connected to R$^6$ to form, for example, an amide of a cyclic amine. Further, the R$^5$ backbone can have additional reactive or non-reactive pendant groups, including hydroxyl groups, aromatic groups, etc.

Examples of useful multifunctional acrylic esters according to formula III include tetraethylene glycol diacrylate, ethylene glycol diacrylate, hexanediol diacrylate, 1,3-butylene glycol diacrylate, 1,4-butanediol diacrylate, diethylene glycol diacrylate, 2,2-dimethylpropane-1,3-diacrylate (neopentyl glycol diacrylate), polyethylene glycol diacrylate, tripropylene glycol diacrylate, trimethylolpropane triacrylate, pentaerythritol triacrylate, pentaerythritol tetraacrylate, ethoxylated bisphenol A diacrylate, dipentaerythritol monohydroxy pentaacrylate, and mixtures thereof. Examples of a multifunctional acrylic amides that can be useful include hexane diamine bis-acrylamide, and methylene bis-acrylamide.

Examples of multifunctional dipolarophiles that include acetylenic ester or acetylenic amide reactive groups can have the general formula:

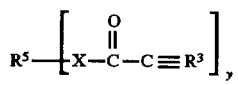
(IV)

wherein y, X, R$^3$, and R$^5$ are as defined above. An example of a useful multifunctional dipolarophile containing an acetylenic ester is hexane diol dipropiolate.

Upon reacting a reactive dipolarophile group of the multifunctional dipolarophile with an azido group of the azido polymer, the azido group will typically derivatize to form either a triazoline or a triazole group. The reaction between an azido group of a polymer and one of the above-described multifunctional dipolarophiles can be illustrated by the following exemplary synthetic schemes:

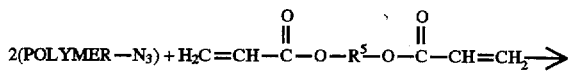

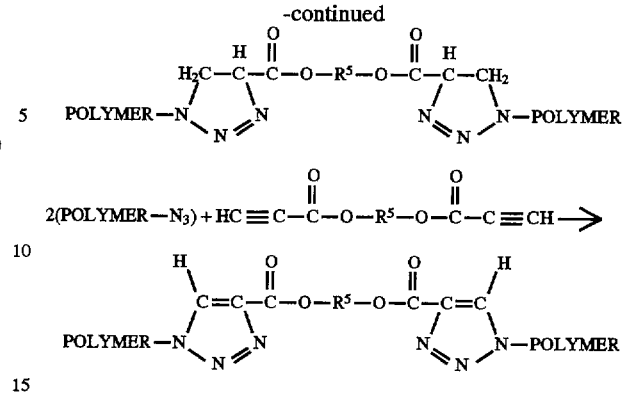

Importantly, each reactive group of the multifunctional dipolarophile can react with an azido group from a different azido polymer molecule. As a result, the different azido polymer molecules will be connected or crosslinked, through triazoline or triazole groups, and through the backbone of the multifunctional dipolarophile molecules.

Generally, the amount of dipolarophile reacted with a given amount of azido polymer can be chosen depending on the chemical identity of the multifunctional dipolarophile and the azido polymer, and the properties of the desired reaction product. In a broad sense, the azido polymer can be crosslinked by any amount of multifunctional dipolarophile that results in a useful polymer material. With the above-described preferred polymers and multifunctional dipolarophiles, useful amounts of multifunctional dipolarophiles have been found to be in the range from about 3 to 100 parts by weight dipolarophile for every 100 parts by weight azido polymer. As used in the present description, ingredients will be defined in terms of parts by weight of an ingredient per hundred parts by weight of the azido polymer (pph). Preferred amounts of the multifunctional dipolarophile are in the range from about 20 to 100 pph. Alternatively, useful amounts of multifunctional dipolarophile per amount of azido polymer can be defined in terms of the stoichiometric ratio of reactive dipolarophile groups per azido groups ("stoichiometric ratio"). This ratio can be as high as 1 reactive dipolarophile group per azido group (1:1 ratio). To ensure that a solid polymer material is formed from the reaction between the azido polymer and the multifunctional dipolarophile it is preferred that the reactants include at least two reactive dipolarophile groups per azido polymer molecule.

In the practice of the present invention, crosslinking of the azido polymer can allow control of the morphology and the rheological properties of the polymer material. The degree of crosslinking between the azido polymer and the multifunctional dipolarophile, in combination with other factors relating to the reactants, can allow the production of a wide variety of solid polymer materials. In this respect, three regimes can be identified, as defined in terms of the stoichiometric ratio of reactive dipolarophile group per azido group in the reactive mixture of azido polymer and multifunctional dipolarophile. The three regimes can be roughly identified as follows: a lesser crosslinked regime produced from reactants having a stoichiometric ratio in the range from about 3:100 to 20:100 reactive dipolarophile group:azido group; an intermediate regime produced from reactants having a stoichiometric ratio in the range from about 20:100 to 50:100; and a highly-crosslinked regime produced from reactants having a stoichiometric ratio in the range from about 50:100 to 100:100. Within each of these regimes, respectively, it is expected that the stoichiometric ratios of reactive dipolarophile group to azido group result in from about 3 to 20 percent, from about 20 to 50 percent, and from about 50 to 100 percent of the azido groups reacting with a reactive dipolarophile group to form either a triazoline or a triazole group.

The above-identified regimes roughly correspond to three (possibly overlapping) hardness ranges as follows: the lesser crosslinked regime typically provides a soft, rubber-like solid polymer material; the intermediate regime typically provides a polymer material of intermediate hardness; and the highly-crosslinked regime typically provides a hard, plastic-like polymer material. More specifically, the hardness of these polymer materials can be measured as Shore A-2 hardness, as described below in the Examples. The soft rubber-like solid typically can have a Shore A-2 hardness in the range from about 0 to 50, the polymer material of intermediate hardness can typically have a Shore A-2 hardness in the range from about 50 to 95, and the hard, plastic-like solid can typically have a Shore A-2 hardness of at least about 95.

The above-identified regimes are to be considered rough estimates of the properties of polymer materials. It is important to remember that many other factors can significantly affect the properties of a polymer material prepared by crosslinking an azido polymer with a multifunctional dipolarophile. These factors include the number of azido groups pendant from the azido polymer (both the absolute number of azido groups per molecule, and the equivalent weight of the azido polymer, i.e., the weight of azido polymer per azido group), the number of reactive groups pendant from the multifunctional dipolarophile (both in terms of absolute number, i.e., functionality, and equivalent weight, i.e., weight of multifunctional dipolarophile molecule per reactive dipolarophile group), the number of dipolarophile groups that react with a given azido polymer, the molecular weight of the azido polymer molecules and of the multifunctional dipolarophile, etc.

It has been observed that the crosslinked polymer materials of the present invention exhibit different burning behavior than non-crosslinked azido polymers, or azido polymers that have been crosslinked with isocyanate-functional crosslinkers. The above-identified regimes can roughly correspond to three different burning behaviors. As measured by burn rate at ambient conditions (approximately 25° C. and one atmosphere pressure), the burning behavior of polymer materials of the above-described regimes is roughly as follows: the lesser crosslinked regime typically produces a polymer material that is self extinguishing if ignited at ambient conditions; the intermediate regime typically produces a polymer material that exhibits sustained burning at ambient conditions; and polymer materials of the highly-crosslinked regime, when ignited at ambient conditions, sometimes exhibit sustained burning (although possibly at a slower rate than the intermediate regime) and sometimes exhibit a rapid, flameless decomposition. It is preferred that at ambient conditions the polymer material has a burn rate of at least about 0.1 inches per second (0.04 centimeters per second), more preferably at least about 0.2 inches per second (0.08 cm per second), and most preferably at least about 0.4 inches per second (0.16 cm per second).

The advantages of the polymer materials of the present invention, as observed in burning behavior at ambient conditions, are expected to correspond to similar advantages in burning behavior at other conditions, such as at elevated temperature and/or elevated pressure. Because the crosslinked polymer material exhibits sustained burning at ambient conditions, it is expected that these crosslinked polymer materials will exhibit relatively faster burning rates at conditions that are more conducive to burning, such as at conditions of higher temperature and/or pressure. Similarly, although some of the polymer materials do not sustain burning if ignited at ambient conditions, it is expected that at conditions of higher pressure or temperature, these polymer materials will exhibit sustained burning.

The crosslinking reaction between the azido polymer and the multifunctional dipolarophile occurs under relatively mild conditions and therefore, the crosslinked polymer materials of the present invention can advantageously be produced at relatively mild conditions. For instance, crosslinking can be accomplished by mixing the azido polymer and the multifunctional dipolarophile (optionally in an appropriate solvent) at ambient conditions for about 1–24 hours. The preferred limits of reaction temperature are in the range from about 0° C. to about 90° C. However, it is especially preferred that the reaction take place at a temperature in the range from about 20° to 60° C., more preferably in the range from about 25° to 40° C. As further considerations for deciding on appropriate reaction conditions, pot life of the polymer material can be extended by using azido polymer of a relatively lower molecular weight, or by using a higher equivalent weight dipolarophile (one that contains fewer reactive dipolarophile groups per unit weight of multifunctional dipolarophile). Further, the reaction rate is typically hindered by the presence of a solvent.

The optional solvent can be any useful solvent such as water or an organic solvent commonly used in the art of high energy polymers, e.g., MEK (methyl ethyl ketone), acetone, diethyl ether, ethanol, ethyl acetate. The amount of solvent can vary, but is typically in the range from about 50 to 1000 parts by weight solvent per hundred parts azido polymer.

Various other chemical groups having desired properties can be covalently bonded (e.g., grafted) to, or reacted with any of the above azido polymers, in whatever manner or loading that will provide desired properties. A chemical group can be bonded to a pendant azido group before or during the completion of the above-described polymerization reaction. Possible groups that might be attached via a pendant azido group include stabilizers, sensitizers, dyes, etc., or polar or electrically charged groups which can, for example, help bond to filler particles.

As a specific example, if a desired combination of hardness and burn rate cannot be achieved by crosslinking with a multifunctional dipolarophile, it is contemplated that azido groups of the azido polymer can be derivatized (either before or during crosslinking) with monofunctional dipolarophiles comprising any of the above-identified reactive dipolarophile groups. While wishing not to be bound by theory, it is hypothesized that the triazoline and triazole groups resulting from the reaction between the reactive dipolarophile the group and the azido group can act as a catalyst in the decomposition reaction of the crosslinked polymer material. Thus, by reacting the azido group with a monofunctional dipolarophile, burning rate of the polymer material can be adjusted, while hardness of the polymer material can be adjusted by controlling the extent of crosslinking. This method of independently affecting hardness of the polymer material and burning properties can similarly be accomplished by reacting the azido polymer with two or more different multifunctional dipolarophiles, each having different functionalities of reactive dipolarophile groups (e.g., using a combination of difunctional and trifunctional multifunctional dipolarophile).

Novel compositions and materials can be produced using the polymer material of the present invention. For instance, the polymer material can be used as an energetic material, in combination with other known materials, to produce high energy materials such as explosives or propellants. As one example, crosslinked polymer material can be combined with an energetic material, such as RDX (1,3,5 trinitraza cyclohexane), to produce explosive materials. Alternatively, the polymer material can be combined with other materials to produce a high energy rocket propellant. As one example, a rocket propellant can be produced by combining the polymer material with ammonium perchlorate, aluminum particles, a plasticizer, a burn rate catalyst, and other materials such as a stabilizer, by methods known in the art, to produce a rocket propellant. One or more of the following materials can also be added to these high energy compositions in useful amounts: plasticizers, non-azido polymers, reinforcing fillers (e.g., fibers), opacifiers to improve ignition and heat feedback properties, oxidizers, pigments and dyes, fuel particles (e.g., aluminum), etc. The materials and processes used in the production of high energy materials are known in the high energy materials art and are described, for example, in U.S. Pat. No. 5,316,600.

As a further example, the polymer material can be used with known materials to produce a gas-producing material for use as a component in an air bag apparatus. One possible embodiment of this gas producing material might comprise the polymer material of the present invention, in combination with ingredients such as: a binder such as cellulose acetate butyrate, or cellulose acetate; an energetic material such as RDX. Minor amounts of additives such as stabilizers, opacifiers, dyes or colorants may also be added. Methods and materials for producing air bags and air bag components are known in the air bag art and are described, for example, in European Patent Application No. 95200697.0 (European Patent Publication 0 673 809 A1), incorporated herein by reference.

The following non-limiting examples further illustrate the present invention.

EXAMPLES

Sample crosslinked polymer materials were prepared and tested as follows. Azido polymer was mixed with a multifunctional dipolarophile (in amounts described in the following tables) in a glass vial under ambient conditions (about 25° C. and one atmosphere pressure). The extent of cure of each sample was examined at regular intervals until gellation occurred, or until no gellation was noted after about 24 hours. Gellation is defined as the condition of no observable flow when the vial was set on its side. "Gel Time" of a material is defined as the amount of time from mixing to gellation. If a sample gelled in the glass vial, the cured sample was removed by shattering the vial.

Samples that might be expected to ignite or burst violently due to the heat of reaction (samples reacting GAP materials with 50 to 100 pph of PE3A, HDDA, or HDDP), were prepared by rapidly mixing the reactants and pouring the mixture into an open pan or a soda straw (0.58 cm diameter by about 12 cm long) with its lower end capped, before the strong exothermic reaction occurred. Also, because neat (solvent free) BAMO does not easily mix with acrylates, samples containing BAMO were produced by first dissolving the BAMO polymer in methylene chloride. The multifunctional dipolarophile was then added to this solution, and the mixture was cured and dried in an open pan.

TEST PROCEDURES

Shore A-2 Hardness: The hardness of test samples was determined using a type A-2 Shore hardness gauge, as measured by ASTM test method D 2240-91, method A.

Burning Behavior: The qualitative burning behavior of polymer materials was measured at ambient conditions by placing a piece of polymer material (about 1 in (2.5 cm)× 0.25 in (0.6 cm)×0.15 (0.4 cm) in, or about 1 gram) on a piece of paper towel and igniting the paper towel. Burning behavior was categorized into one of the following categories:

(1) Self Extinguishment (SE)—typically the surface vaporized at the ignition source, but the heat feedback to the surface was insufficient to sustain burning.

(2) Sustained Burning (SB)—samples were rapidly and completely consumed by burning.

Quantitative burning rates at ambient conditions were measured using samples prepared by curing the azido polymer and polyfunctional dipolarophile reactants in soda straws (as described above). The straw was removed from each sample, and the lower end of each rod-shaped sample was clamped to position the sample in a vertical position. The upper end of the sample was ignited. The burning rate was calculated by dividing the length of the sample by the amount of time taken for the sample to completely burn, as measured using a stopwatch.

Example 1

Samples 1–19 were prepared as described above by curing GAP Polyol with various amounts of multifunctional dipolarophiles. The amount of each ingredient is given in Table 1 in parts multifunctional dipolarophile per hundred parts of GAP Polyol (pph). The dipolarophile:azido stoichiometric ratio was calculated for each sample. Gel Time, Shore A-2 hardness, and burning behavior were measured and recorded for each sample. Sample 18 ignited during curing.

Comparative Samples C1 and C2 were prepared by reacting GAP Polyol with IPDI and Desmodur™ N-3200 polyisocyanates respectively, in the presence of about 100 parts per million (based on total mixture weight) dibutyl tin dilaurate, using the appropriate amount of isocyanate curative (given in parts per hundred part GAP polyol, pph) to give a hydroxyl:isocyanate stoichiometric ratio of approximately 1:1. Shore A-2 hardness and burning behavior were recorded, and results are presented in Table 1.

TABLE 1

| Sample | crosslinking agent: | | | Gel Time | Shore A-2 | Burn. Behav. |
|---|---|---|---|---|---|---|
| | Name | pph | Stoich.Ratio | (min) | Hardness | (ips) |
| 1 | PE3A | 100 | 1.00:1 | 30 | 100 | SB (0.43) |
| 2 | PE3A | 60 | 0.60:1 | | no test | SB (0.41) |
| 3 | PE3A | 50 | 0.50:1 | 25 | 98 | SB (0.50) |
| 4 | PE3A | 40 | 0.40:1 | | no test | SB (0.55) |
| 5 | PE3A | 30 | 0.30:1 | | no test | SB (0.48) |
| 6 | PE3A | 20 | 0.20:1 | 36 | 90 | SB (0.22) |
| 7 | PE3A | 10 | 0.10:1 | 50 | 66 | SE |
| 8 | PE3A | 5 | 0.05:1 | 90 | 25 | SE |
| 9 | SR344 | 20 | 0.08:1 | 180 | 36 | SE |
| 10 | SR344 | 24 | 0.09:1 | 180 | 50 | SE |
| 11 | HDDA | 100 | 0.88:1 | 120 | 99.5 | SB |
| 12 | HDDA | 50 | 0.44:1 | 120 | 97 | SB (3 sec) |
| 13 | HDDA | 20 | 0.18:1 | 120 | 79 | SB (65%) |
| 14 | HDDA | 10 | 0.09:1 | 180 | 51 | SE |
| 15 | HDDA | 5 | 0.04:1 | 300 | 7 | SE |
| 16 | HDDP | 100 | 0.90:1 | <20 | 100 | SB (0.08) |
| 17 | HDDP | 50 | 0.45:1 | <20 | 95 | SB (0.04) |
| 18 | HDDP | 20 | 0.18:1 | <20 | 60 | SE |
| 19 | HDDP | 10 | 0.09:1 | <20 | 40 | SE |
| C1 | IPDI | 5.4 | 1.00:1 | N/A | 20 | SE |
| C2 | N3200 | 9 | 1.00:1 | N/A | 42 | SE |

The data in Table 1 show that polymers formed by crosslinking GAP Polyol with various multifunctional dipolarophiles exhibited increased hardness with increased levels of multifunctional dipolarophile. At low dipolarophile:azido stoichiometric ratios (about 0.05:1), very soft, sticky gumstocks resulted which often developed spherical voids during cure, or planar cracks under storage conditions. As the amount of dipolarophile was increased, firmer, non-tacky rubbery materials were formed. Further increases in the level of multifunctional dipolarophile led to firm but easily broken (i.e., "cheesy") solids. At dipolarophile:azido stoichiometric ratios equal to or greater than about 0.2:1, very hard, clear solids were typically formed, having good transparency and plastic-like properties. When scratched firmly or impacted by a hammered awl, the hardest solids (Samples 1, 3, and 11) could be made to decompose rapidly with no flame but with copious yellowish smoke evolution, leaving behind a brittle, expanded, foamy char of about 10% of the initial weight of the sample.

The data in Table 1 also show that polymer materials formed by crosslinking GAP Polyol with multifunctional dipolarophiles at dipolarophile:azido stoichiometric ratios of about 0.20:1 or greater exhibited sustained burning behavior at ambient conditions and were not self-extinguishing, as were polymer materials produced by crosslinking GAP Polyol with IPDI or Desmodur™ N-3200 isocyanates.

Example 2

Samples 20–24 were prepared as described above, by crosslinking GAP Diol with varying amounts of PE3A, as reported in parts by weight PE3A per hundred parts GAP Diol (pph). Samples 25–29 were prepared by crosslinking GAP Diol varying amounts of hexanediol diacrylate (HDDA). The dipolarophile:azido stoichiometric ratio was calculated for each sample. Gel Time, Shore A-2 hardness and burning behavior were measured, and results are presented in Table 2.

TABLE 2

| Sample | Crosslinking Agent: Name | pph | Stoich.Ratio | Gel Time (min) | Shore A-2 Hardness | Burn. Behav. (ips) |
|---|---|---|---|---|---|---|
| 20 | PE3A | 100 | 1.00:1 | 35 | 100 | SB (2 sec) |
| 21 | PE3A | 50 | 0.50:1 | 38 | 100 | SB |
| 22 | PE3A | 20 | 0.20:1 | 56 | 86 | SB (3 sec) |
| 23 | PE3A | 10 | 0.10:1 | 85 | 52 | SE |
| 24 | PE3A | 5 | 0.05:1 | 210 | 2 | SE |
| 25 | HDDA | 100 | 0.88:1 | 59 | 100 | no test |
| 26 | HDDA | 50 | 0.44:1 | 150 | 89 | SB (2.2 sec) |
| 27 | HDDA | 20 | 0.18:1 | 200 | 71 | SE |
| 28 | HDDA | 10 | 0.09:1 | 360 | 14 | SE |
| 29 | HDDA | 5 | 0.04:1 | none | no test | no test |

The data in Table 2 show that GAP Diol can be crosslinked with either pentaerythritol triacrylate or hexanediol diacrylate to produce a solid polymer material. When the crosslinking agent was pentaerythritol triacrylate at a stoichiometric ratio of about 0.20:1 or greater, or hexanediol diacrylate at a stoichiometric ratio of about 0.44:1 or greater, the solid polymer material exhibited sustained burning upon ignition at ambient conditions. Sample 20 decomposed when impacted with a hammered awl, while Sample 21 decomposed when scratched with an awl.

Example 3

Samples 30–34 were prepared by crosslinking GAP Plasticizer with varying amounts of pentaerythritol triacrylate (PE3A) per hundred parts of GAP Plasticizer (pph). Samples 35–38 were prepared by crosslinking GAP Plasticizer with varying amounts of hexanediol diacrylate (HDDA). The dipolarophile:azide stoichiometric ratio was calculated for each sample. Gel Time, Shore A-2 hardness and burning behavior were measured, and results are presented in Table 3. Sample 31 ignited during cure. Sample 30. decomposed when impacted with a hammered awl, while Sample 35 did not ignite when impacted with a hammered awl.

TABLE 3

| Sample | Crosslinking Agent Name | pph | Stoich.Ratio | Gel Time (min) | Shore A-2 Hardness | Burn. Behav. (ips) |
|---|---|---|---|---|---|---|
| 30 | PE3A | 100 | 1.00:1 | 53 | 98 | SB |
| 31 | PE3A | 50 | 0.50:1 | 25 | no test | SB |
| 32 | PE3A | 25 | 0.25:1 | 98 | 63 | SB (3.7 sec) |
| 33 | PE3A | 12.5 | 0.13:1 | 390 | 0 | SE (2.2 sec) |
| 34 | PE3A | 7.5 | 0.08:1 | none | liquid | no test |
| 35 | HDDA | 113 | 1.00:1 | 300 | 100 | SB (2.0 sec) |
| 36 | HDDA | 50 | 0.44:1 | 300 | 70 | SB (2.5 sec) |
| 37 | HDDA | 25 | 0.22:1 | none | liquid | no test |
| 38 | HDDA | 7.5 | 0.07:1 | none | liquid | no test |

The data in Table 3 show that GAP Plasticizer can be crosslinked with pentaerythritol triacrylate (PE3A) or hexanediol diacrylate to produce a solid polymer material. When crosslinked with pentaerythritol triacrylate at a stoichiometric ratio of about 0.25:1 or greater, or when crosslinked with hexanediol diacrylate at a stoichiometric ratio of about 0.44:1 or greater, the polymer material exhibited sustained burning properties when ignited at ambient conditions.

A comparison of Examples 1, 2, and 3, reacting GAP Polyol, GAP Diol, and GAP Plasticizer having number average molecular weights of 5500, 2400, and 700, respectively, shows that at similar stoichiometric ratios, the hardness of a cured polymer material can vary with the molecular weight of the azido polymer in the following manner: polymer materials derived from 5500 molecular weight azido polymer were generally harder than polymer materials derived from 2400 molecular weight azido polymers, which were generally harder than polymer materials derived from 700 molecular weight azido polymer. Gel Time also varied with the molecular weight of the azido polymer in the following manner: 5500 molecular weight azido polymer cured faster than 2400 molecular weight azido polymer, which cured faster than 700 molecular weight azido polymer. In this comparison, the difference in hydroxyl functionality of the GAP polymers is not believed to be a significant factor in the differences observed in hardness or Gel Time properties because the crosslinking reaction takes place at the azide group, not the hydroxyl group of the azido polymer.

Example 4

Samples 39–42 were prepared by crosslinking poly (bisazidomethyloxetane) (BAMO) with varying amounts of pentaerythritol (PE3A) per hundred parts of BAMO (pph). Samples 43–46 were prepared by curing BAMO polymer with varying amounts of hexanediol diacrylate (HDDA). Sample 47 was prepared by curing BAMO polymer with hexanediol dipropiolate (HDDP). The dipolarophile:azido stoichiometric ratio was calculated for each sample. Shore A-2 hardness and burning behavior were measured and recorded for each sample; Gel Time was not recorded.

Sample 39 and 43 formed a char when burned. Results are presented in Table 4.

TABLE 4

| Sample | Crosslinking Agent: Name | pph | Stoich.Ratio | Shore A-2 Hardness | Burn. Behav. (ips) |
|---|---|---|---|---|---|
| 39 | PE3A | 100 | 0.84:1 | 99 | SB (0.24) |
| 40 | PE3A | 50 | 0.42:1 | 100 | SB (0.34) |
| 41 | PE3A | 33 | 0.28:1 | 95 | SB (0.09) |
| 42 | PE3A | 10 | 0.08:1 | 70 | SE |
| 43 | HDDA | 100 | 1.05:1 | 73 | SB (0.26) |
| 44 | HDDA | 50 | 0.52:1 | 71 | SB (0.07) |
| 45 | HDDA | 33 | 0.35:1 | 70 | SE |
| 46 | HDDA | 10 | 0.11:1 | 55 | SE |
| 47 | HDDP | 50 | 0.53:1 | 84 | SE |

The data in Table 4 show that BAMO polymer can be crosslinked with PE3A, HDDA, or HDDP to form a solid polymer material of varying hardness. When crosslinked with pentaerythritol triacrylate at a stoichiometric ratio of about 0.28:1 or greater, or when crosslinked with hexanediol diacrylate at a stoichiometric ratio of about 0.52:1 or greater, the polymer material exhibited sustained burning properties when ignited at ambient conditions.

Example 5

Samples 48–50 were prepared by crosslinking GAP Polyol with varying amounts of tetraethylene glycol diacrylate (TEGDA) per hundred parts GAP Polyol (pph). Sample 51 was prepared by crosslinking GAP Polyol with hexanediol diacrylate. Sample 52 was prepared the same as Sample 51 except that 2% (wt) of water was added. Sample 53 was prepared by crosslinking GAP Polyol with hexanediol dipropiolate. Sample 54 was prepared by crosslinking GAP Polyol with pentaerythritol triacrylate. Comparative Sample C3 was prepared by attempting to cure GAP Polyol with hexanediol dimethacrylate at 60° C. Comparative Sample C4 was prepared by attempting to cure GAP Polyol with hexanediol divinyl ether at 60° C.

The dipolarophile:azido stoichiometric ratio was calculated for each sample. Qualitative curing comments, Shore A-2 hardness and burning behavior were measured and recorded for each cured sample. Results are presented in Table 5.

TABLE 5

| Sample | Crosslinking Agent: Name | pph | Stoich.Ratio | Curing Comments | Shore A-2 Hardness | Burn. Behav. (ips) |
|---|---|---|---|---|---|---|
| 48 | TEGDA | 9 | 0.06:1 | | firm | SE |
| 49 | TEGDA | 6.5 | 0.04:1 | | firm | no test |
| 50 | TEGDA | 3.6 | 0.02:1 | | soft | no test |
| 51 | HDDA | 6.2 | 0.05:1 | cheesy | firm | SB |
| 52* | HDDA | 6.2 | 0.05:1 | | 25 (firm) | SB/SE |
| 53 | HDDP | 5.5 | 0.05:1 | | firm | SE |
| 54 | PE3A | 5.6 | 0.06:1 | cheesy | hard | SB |
| C3 | HDDMA | 7 | 0.07:1 | foamy | soft | SE |
| C4 | HDDVE | 4.5 | 0.05:1 | none** | liquid | no test |

*Sample contained 2% water based on total solids
**No cure after 16 hr. @ 60° C.

The data in Table 5 show that GAP polyol can be successfully crosslinked with tetraethylene glycol diacrylate. The data also show that vinyl ethers and methacrylates are inferior to acrylates and propiolates as curing agents for GAP Polyol. The data additionally show that addition of water to the GAP Polyol/hexanediol diacrylate mixture does not adversely affect the hardness of the resulting polymer material.

Example 6

100 parts by weight cellulose butyrate-acetate (CAB), 100 parts by weight GAP Plasticizer, and an amount of pentaerythritol triacrylate (PE3A) (parts by weight as designated in Table 6) were dissolved in 900 parts by weight ethyl acetate. 10 g of each mixture was poured into a dish and allowed to air-dry at room temperature in an air stream, followed by drying for 1 hour at 50° C. in an air-circulation oven to form an interpenetrating polymer network. Sample C5, produced without PE3A, formed a clear, flexible film. Sample 57, produced with 25 parts of PE3A, formed a slightly stiffer, slightly hazy film. Sample 56, produced with 50 parts of PE3A, formed an even stiffer film having more haze, but the film was still flexible enough to be folded. Sample 55, produced with 100 parts of PE3A, formed a hard, brittle, hazy film. The burn behavior of each film was measured, and the data is presented in Table 6.

TABLE 6

| Sample | Crosslinking Agent: Name | pph | Stoich.Ratio | CAB (pph) | Burn. Behav. (ips) |
|---|---|---|---|---|---|
| 55 | PE3A | 100 | 1.00:1 | 100 | 0.16 |
| 56 | PE3A | 50 | 0.50:1 | 100 | 0.34 |
| 57 | PE3A | 25 | 0.25:1 | 100 | 0.52 |
| C5 | — | — | — | 100 | 0.34 |

The data of Table 6 demonstrate the possible use of polymer materials of the present invention to form an interpenetrating polymer network with cellulose acetate butyrate. Such an energetic interpenetrating polymer network might be useful as a rapid source of heated gas to inflate automotive air bags. At a stoichiometric ratio of 0.25:1 (Sample 57), the pentaerythritol triacrylate improved the burn behavior of the cellulose acetate butyrate/GAP Plasticizer blend alone (Sample C5), thus improving the rate of gas generation and resultant ability to quickly inflate an air bag.

Example 7

2 drops of a mixture of 10 parts by weight of GAP Plasticizer and 2 parts by weight HDDA was applied to a clean glass slide. A second clean glass slide was placed on top of the mixture. The next day, the two glass slides were securely adhered to each other.

GLOSSARY

GAP Polyol: glycidyl azide polymer commercially available from 3M Company under the trade designation GAP 5527, and having a structure mostly of linear chains containing —$CH_2CH(CH_2N_3)O$— repeating units. The material had a number average molecular weight of approximately 5500, and a nominal hydroxyl functionality of 2.7 hydroxyl groups per molecule.

GAP Diol: glycidyl azide polymer commercially available from 3M under the trade designation L-9961, and having the structure of a linear chain containing repeating —$CH_2CH(CH_2N_3)O$— units. The material had a number average molecular weight of approximately 2400, and a nominal hydroxyl functionality of 2.0 hydroxyl groups.

GAP Plasticizer: glycidyl azide polymer commercially available from 3M under the trade designation L-12616, and having the structure of a linear chain containing repeating —CH$_2$CH(CH$_2$N$_3$)O— units. The material had a number average molecular weight of approximately 700, and no hydroxyl content.

BAMO: Poly(bisazidomethyloxetane), commercially available from Aerojet General Corporation, of Sacramento Calif.

PE3A: Pentaerythritol triacrylate, commercially available from UCB Radcure, Inc. of Smyrna, Ga.

SR344: 400 molecular weight polyethylene glycol diacrylate, commercially available from Sartomer Corp., West Chester Pa.

HDDA: Hexanediol diacrylate, commercially available from Aldrich Chemical Co., Milwaukee, Wis.

HDDMA: Hexanediol dimethacrylate, commercially available from Aldrich Chemical Co., Milwaukee, Wis.

TEGDA: Tetraethylene glycol diacrylate, commercially available from Aldrich Chemical Co., Milwaukee, Wis.

HDDP: Hexanediol dipropiolate, obtained by mixing 1 mole hexanediol, 2 moles propiolic acid, and 2 moles BF$_3$-etherate, and allowing the mixture to react at room temperature for about a week. The reaction product was washed 3 times with 3 times the volume of the reaction product of water for each wash. The aqueous phases were discarded, and the solvent was removed from the organic phase, leaving HDDP.

HDDVE: Hexanediol divinyl ether, commercially available from Aldrich Chemical Co., Milwaukee, Wis.

IPDI: Isophorone diisocyanate, commercially available from Huls, Americas Inc. of Piscataway, N.J.

N3200: Desmodur™ N-3200, a triisocyanate commercially available from Miles Corp. of Pittsburgh Pa.

CAB: Cellulose acetate butyrate type 381-20, commercially available from Eastman Chemical of Kingsport Tenn.

What is claimed is:

1. A crosslinked polymer material formed from the reaction between ingredients comprising:
   (a) an azido polymer containing at least about 30 weight percent azido groups; and
   (b) at least one multifunctional dipolarophile comprising reactive groups selected from an acrylic ester and an acrylic amide, wherein the polymer material exhibits sustained burning if ignited at approximately 25° C. and atmospheric pressure.

2. The polymer material according to claim 1, wherein the azido polymer is selected from the group consisting of: linear glycidyl azide polymer diols, linear or branched glycidyl azide polymer polyols, linear or branched glycidyl azide polymer plasticizers, polymers or copolymers of azido containing oxetanes, and mixtures thereof.

3. The polymer material according to claim 1, wherein the azido polymer contains at least about 20 percent by weight azido groups.

4. The polymer material according to claim 1, wherein the azido polymer contains at least about 40 percent by weight azido groups.

5. The polymer material according to claim 1, wherein the azido polymer has a molecular weight in the range from about 200 to 100,000.

6. The polymer material according to claim 1, wherein the azido polymer has a molecular weight in the range from about 500 to 25,000.

7. The polymer material according to claim 1, wherein the azido polymer has a molecular weight in the range from about 700 to 10,000.

8. The polymer material according to claim 1, wherein the multifunctional dipolarophile is chosen from the group consisting of a diacrylate, a triacrylate, or mixtures thereof.

9. The polymer material according to claim 1, wherein the multifunctional dipolarophile is chosen from the group consisting of tetraethylene glycol diacrylate, ethylene glycol diacrylate, hexanediol diacrylate, 1,3-butylene glycol diacrylate, 1,4-butanediol diacrylate, diethylene glycol diacrylate, 2,2-dimethylpropane-1,3-diacrylate (neopentyl glycol diacrylate), polyethylene glycol diacrylate, tripropylene glycol diacrylate, trimethylolpropane triacrylate, pentaerythritol triacrylate, pentaerythritol tetraacrylate, ethoxylated bisphenol A diacrylate, dipentaerythritol monohydroxy pentaacrylate, and mixtures thereof.

10. The polymer material according to claim 1, wherein about 3 to 20 percent of the azido groups are reacted with a reactive group of the dipolarophile to form a triazoline group.

11. The polymer material according to claim 1, wherein 20 to 50 percent of the azido groups are reacted with a reactive group of the dipolarophile to form a triazoline group.

12. The polymer material according to claim 1, wherein about 50 to 100 percent of the azido groups are reacted with a reactive group of the dipolarophile to form a triazoline group.

13. The polymer material according to claim 1, wherein the polymer material has a burn rate of at least about 0.04 centimeters per second, at atmospheric pressure.

14. The polymer material according to claim 1, wherein the polymer material has a burn rate of at least about 0.08 centimeters per second, at atmospheric pressure.

15. The polymer material according to claim 1, wherein the polymer material has a burn rate of at least about 0.16 centimeters per second, at atmospheric pressure.

16. The polymer material according to claim 1, wherein the polymer material has a Shore A-2 hardness in the range from about 0 to 50.

17. The polymer material according to claim 1, wherein the polymer material has a Shore A-2 hardness in the range from about 50 to 95.

18. The polymer material according to claim 1, wherein the polymer material has a Shore A-2 hardness of at least about 95.

19. An explosive material comprising the polymer material of claim 1.

20. The explosive material of claim 19, wherein the polymer material has a burn rate of at least about 0.04 centimeters per second, at atmospheric pressure.

21. A method of modifying the burning properties of an azido polymer, the method comprising the steps of:
   (a) providing an azido polymer that contains at least about 30 weight percent azido groups, and
   (b) crosslinking the azido polymer with a multifunctional dipolarophile comprising reactive groups selected from an acrylic ester and an acrylic amide, wherein the polymer material exhibits sustained burning if ignited at approximately 25° C. and atmospheric pressure.

22. The method according to claim 21, wherein the crosslinking reaction occurs at a temperature in the range from about 0° C. to about 90° C.

23. The method according to claim 21, wherein the crosslinking reaction occurs at a temperature in the range from about 20° C. to 60° C.

24. The method according to claim 21, wherein the crosslinking reaction occurs at a temperature in the range from about 25° C. to 40° C.

25. The method according to claim 24, wherein the azido polymer is selected from the group consisting of: linear glycidyl azide polymer diols, linear or branched glycidyl azide polymer polyols, linear or branched glycidyl azide polymer plasticizers, polymers or copolymers of azido containing oxetanes, and mixtures thereof.

26. The method according to claim 21, wherein the azido polymer contains at least about 30 percent by weight azido groups.

27. The method according to claim 21, wherein the azido polymer contains at least about 40 percent by weight azido groups.

28. The method according to claim 21, wherein the azido polymer has a molecular weight in the range from about 200 to 100,000.

29. The method according to claim 21, wherein the azido polymer has a molecular weight in the range from about 500 to 25,000.

30. The method according to claim 21, wherein the azido polymer has a molecular weight in the range from about 700 to 10,000.

31. The method according to claim 21, wherein the multifunctional dipolarophile is chosen from a group consisting of a diacrylate, a triacrylate, or mixtures thereof.

32. The method according to claim 21, wherein the multifunctional dipolarophile is chosen from the group consisting of tetraethylene glycol diacrylate, ethylene glycol diacrylate, hexanediol diacrylate, 1,3-butylene glycol diacrylate, 1,4-butanediol diacrylate, diethylene glycol diacrylate, 2,2-dimethylpropane-1,3-diacrylate (neopentyl glycol diacrylate), polyethylene glycol diacrylate, tripropylene glycol diacrylate, trimethylolpropane triacrylate, pentaerythritol triacrylate, pentaerythritol tetraacrylate, ethoxylated bisphenol A diacrylate, dipentaerythritol monohydroxy pentaacrylate, and mixtures thereof.

33. The method according to claim 21, wherein about 3 to 20 percent of the azido groups react with a reactive group of the dipolarophile to form a triazoline group.

34. The method according to claim 21, wherein about 20 to 50 percent of the azido groups react with a reactive group of the dipolarophile to form a triazoline group.

35. The method according to claim 21, wherein about 50 to 100 percent of the azido groups react with a reactive group of the dipolarophile to form a trialoline group.

36. The method according to claim 21, wherein the polymer material has a burn rate of at least about 0.04 centimeters per second, at atmospheric pressure.

37. The method according to claim 21, wherein the polymer material has a burn rate of at least about 0.08 centimeters per second, at atmospheric pressure.

38. The method according to claim 21, wherein the polymer material has a burn rate of at least about 0.16 centimeters per second, at atmospheric pressure.

39. The method according to claim 21, wherein the polymer material has a Shore A-2 hardness in the range from about 0 to 50.

40. The method according to claim 21, wherein the polymer material has a Shore A-2 hardness in the range from about 50 to 95.

41. The method according to claim 21, wherein the polymer material has a Shore A-2 hardness of at least about 95.

* * * * *